No. 733,684. PATENTED JULY 14, 1903.
H. TERRY.
GATE.
APPLICATION FILED JAN. 16, 1903.
NO MODEL. 2 SHEETS—SHEET 2.

Witnesses
Hiram Terry, Inventor.
by C. A. Snow & Co.
Attorneys

No. 733,684.

Patented July 14, 1903.

UNITED STATES PATENT OFFICE.

HIRAM TERRY, OF HEREFORD, TEXAS.

GATE.

SPECIFICATION forming part of Letters Patent No. 733,684, dated July 14, 1903.

Application filed January 16, 1903. Serial No. 139,311. (No model.)

*To all whom it may concern:*

Be it known that I, HIRAM TERRY, a citizen of the United States, residing at Hereford, in the county of Deaf Smith and State of Texas, have invented a new and useful Gate, of which the following is a specification.

My invention relates to gates, and is especially directed to gates which are adapted to swing downward from a vertical to a horizontal position and lie flush with the surface of the ground in position for a vehicle to pass over the same, and has for its object to provide a simple and efficient mechanism operated, preferably, by the wheels of a vehicle to positively move the gate from its closed to its open position, and vice versa.

The invention comprises the details of construction and combination of parts more fully hereinafter described.

Figure 1:
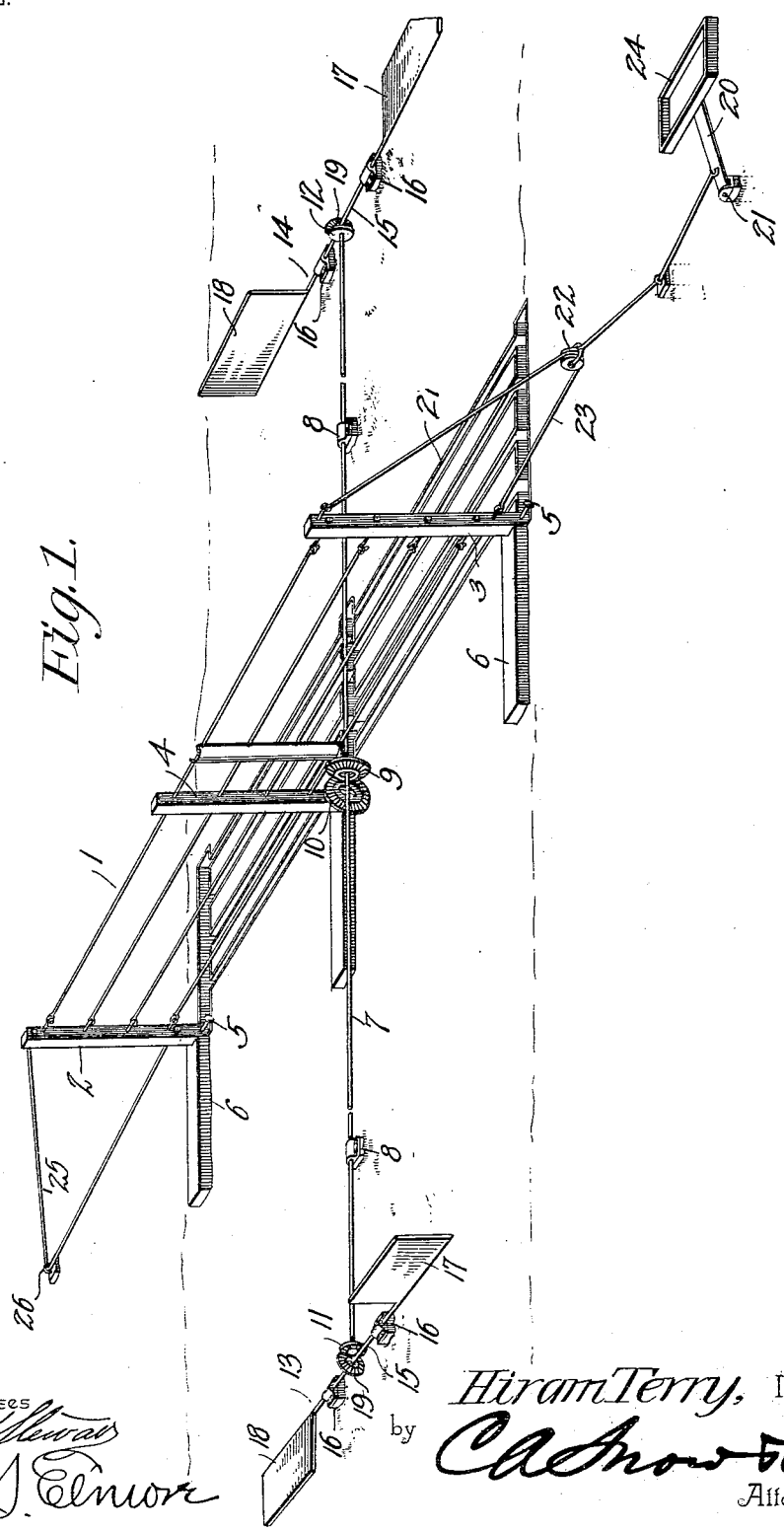
Figure 2:
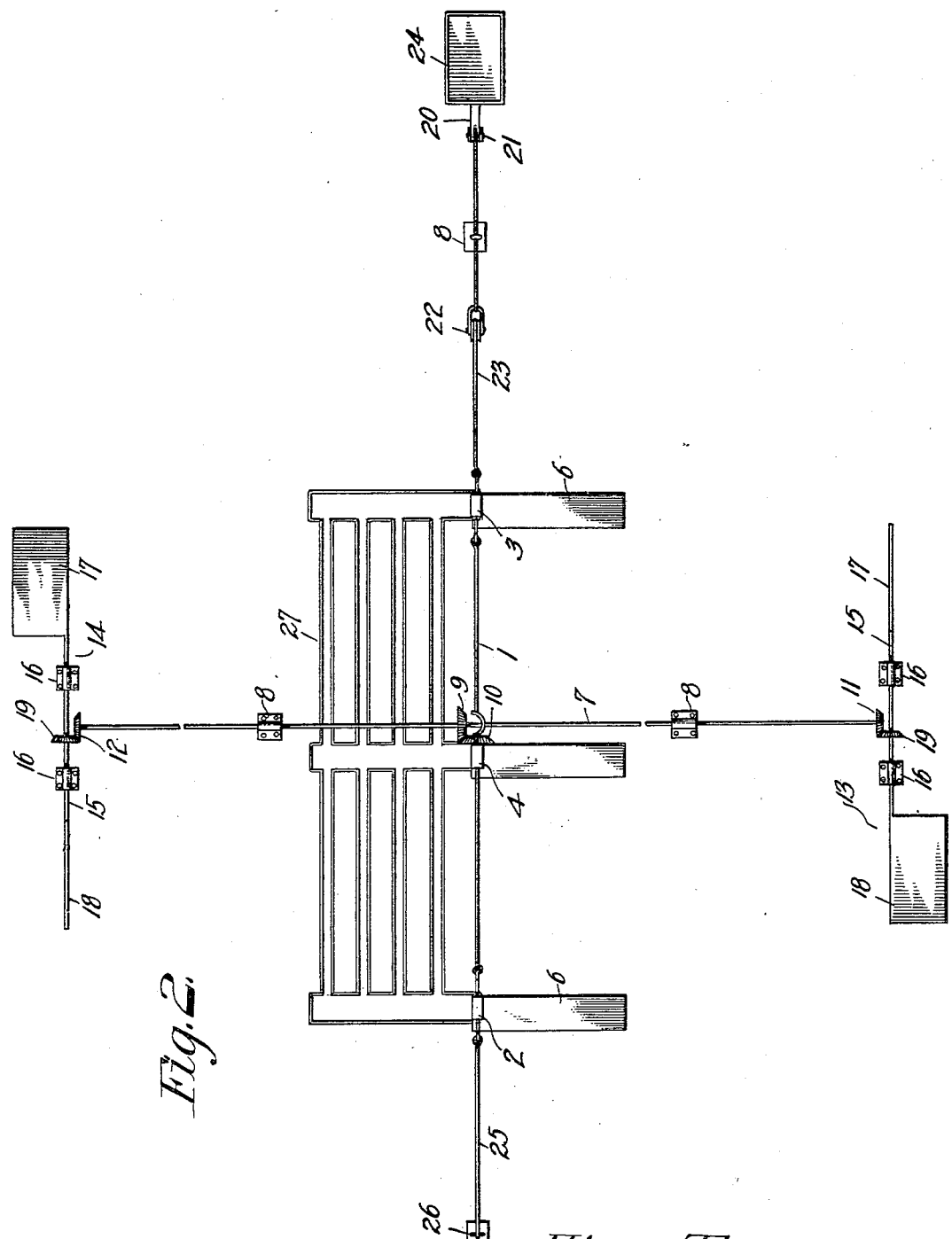

In the accompanying drawings, Figure 1 is a perspective view of the device. Fig. 2 is a top plan view of the same.

Referring to the drawings, 1 indicates a gate of any suitable construction, but preferably comprising end posts 2 and 3 and a center post 4, having wires stretched between the posts. The posts are pivoted at their lower ends and adapted to swing upon horizontal pivoting-rods 5, journaled in or otherwise secured to horizontal base plates or beams 6, fixed in any suitable manner at the surface of the ground. The pivotal rods 5 project laterally beyond the posts longitudinally of the gate and are provided with suitable heads for the purpose to be hereinafter described.

7 indicates a horizontal rod which extends at right angles to the gate adjacent to the central post 4 and is sustained for rotation in suitable bearings 8. Mounted on the rod for rotation thereby is a beveled gear 9, in mesh with a similar gear 10, fixed in any suitable manner to the lower end of the central gate-post 4. 11 and 12 indicate bevel-pinions mounted at the ends of the rod at opposite sides of the gate and at a suitable distance from the gate.

13 and 14 indicate two operating members situated one at either side of the gate adjacent to the respective ends of the rod 7. Each of these operating members comprises a short shaft 15, mounted for rotation in a suitable bearing 16 and provided at each end with a fixed wing or blade 17 or 18, which lie, respectively, in the path of passing vehicles in position to be actuated by the wheels thereof in the manner and for the purpose hereinafter explained.

19 indicates a bevel-pinion mounted on the shaft 15 in mesh with the pinion at the end of the shaft 7 and adapted when the shaft 15 is rotated by the vehicle-wheels striking either of the blades 17 or 18 to rotate the shaft 7 and through the medium of the gears 9 and 10 positively swing the gate on its pivot from an open to a closed position, or vice versa.

20 is a lever pivoted at 21 and lying in a plane parallel with the longitudinal direction of the gate. This lever is connected at its inner end with a pulley 22, around which passes a cable or the like 23, connected at its ends to the upper and lower ends of the post 3. The opposite or outer end of the lever is provided with a suitable weight 24, which exerts a pressure on the lever and causes the same to exert a suitable tension on the gate through the medium of the pulley and cable, and thus maintain the same in its normally closed position, except when positively opened by the mechanism above described. 25 is a similar cable connected to the upper and lower ends of the post 2 and engaged between its ends with a fixed stop 26 and serving, as will be readily understood, to equalize the tension on the gate exerted by the weight and its attendant mechanism. Should the cable 25 become slack owing to expansion or other causes, the gate is susceptible of a slight movement in the direction of its length along the extended pivots 5, thus permitting the weight to move the gate and compensate for such slack and maintain at all times the proper tension.

In operation, supposing the parts to be in the position illustrated in Fig. 1 and a vehicle to be approaching the gate from the left, the vehicle-wheel will come in contact with the blade 17 and turn the same from a vertical to a horizontal position, thus rotating the shaft 15 and imparting motion therefrom through the medium of gear-pinions 19 and 11 to the shaft 7. The shaft 7 in rotating will, through the medium of gears 9 and 10, serve to positively swing the gate downward until it has passed the center of and falls by gravity, to a horizontal position flush with the surface of the ground in position to be passed over by the wheels of the vehicle. After the vehicle has passed the gate its wheels will come in contact with the blade 17 at the opposite end of the shaft and cause the same to swing from a vertical position, to which it has been moved by the previous rotation of the shaft, to a horizontal position, thus again rotating the shaft through the medium of gears 19 and 12 in the opposite direction to cause the gears 9 and 10 to positively lift the gate from its horizontal to its vertical position, the mechanism being assisted in this lifting action by means of the weight and its attendant mechanism. It will be seen that by locating the shaft 7 and its actuating mechanism in position to operate upon the central post of the gate the weight of the gate is more evenly distributed and the movement of the ends of the gate is more uniform than would be the case if the mechanism operated upon one of the end posts, with a consequent saving in wear upon the parts.

27 indicates a suitable bridgework constructed at the surface of the ground in position to receive the gate when the same is moved to its horizontal position in order to protect the gate from being damaged by the vehicle-wheels.

From the foregoing it will be seen that I produce a device simple of construction and inexpensive to erect, which is adapted to be actuated by the wheels of a passing vehicle to positively open or close the gate, and in attaining these ends I do not limit or confine myself to the details herein shown and described, inasmuch as various changes may be made therein without departing from the spirit or scope of my invention.

Having thus described my invention, what I claim is—

1. The combination with a gate pivoted at its lower end to swing in a vertical plane in a direction longitudinally of the roadway, of a gear carried by the gate, a rotary shaft, a gear carried thereby in mesh with the gear on the gate for swinging the gate to an open or closed position when the shaft is rotated, means at one end of the shaft operable for rotating the same in one direction to open the gate, and means at the other end of the shaft operable for rotating the same in the opposite direction to close the gate.

2. The combination with a gate pivoted at its lower end to swing in a vertical plane in a direction longitudinally of the roadway, of a main rotary shaft in gear connection with the gate and operable for swinging the same on its pivot to an open or closed position, a secondary shaft at one end of the main shaft in gear connection therewith and operable for rotating the main shaft in one direction to open the gate, and a secondary shaft at the opposite end of the main shaft in gear connection therewith and operable for rotating the main shaft in the opposite direction to close the gate.

3. The combination with a gate pivoted at its lower end, of a gear carried thereby, a main shaft, a gear carried thereby in mesh with the gear on the gate and adapted, when the shaft is rotated, to positively swing the gate on its pivot, a secondary shaft in gear connection with the main shaft and adapted, when rotated, to rotate the main shaft, and means actuated by the vehicle-wheels for rotating the secondary shaft.

In testimony that I claim the forgoing as my own I have hereto affixed my signature in the presence of two witnesses.

HIRAM TERRY.

Witnesses:
J. L. CLARK,
J. T. INMON.